(12) United States Patent
Bose et al.

(10) Patent No.: US 9,977,562 B2
(45) Date of Patent: May 22, 2018

(54) SYSTEM AND METHOD FOR FACILITATING AN INTERACTIVE ENGAGEMENT OF A USER WITH AN ONLINE APPLICATION

(71) Applicant: Tata Consultancy Services Limited, Maharashtra (IN)

(72) Inventors: Sneha Bose, Karnataka (IN); Vibhor Goswami, Karnataka (IN); Shalin Garg, Karnataka (IN); Sandhya S L, Karnataka (IN); Sathish Vallat, Karnataka (IN); Nikhil Sahoo, Karnataka (IN); Annie Thomas, Karnataka (IN)

(73) Assignee: TATA CONSULTANCY SERVICES LIMITED (IN)

( * ) Notice: Subject to any disclaimer, the term of this patent is extended or adjusted under 35 U.S.C. 154(b) by 187 days.

(21) Appl. No.: 14/313,247

(22) Filed: Jun. 24, 2014

(65) Prior Publication Data

US 2014/0380179 A1    Dec. 25, 2014

(30) Foreign Application Priority Data

Jun. 24, 2013    (IN) .......................... 1839/MUM/2013

(51) Int. Cl.
*G06Q 30/00*       (2012.01)
*G06F 3/0481*     (2013.01)
*G06Q 10/10*       (2012.01)

(52) U.S. Cl.
CPC ........... *G06F 3/0481* (2013.01); *G06Q 10/10* (2013.01)

(58) Field of Classification Search
CPC .............................. G06F 3/0481; G06Q 10/10
(Continued)

(56) References Cited

U.S. PATENT DOCUMENTS 8,601,059 B2    12/2013  Chan et al.
2005/0260549 A1*  11/2005  Feierstein ................ G09B 7/02
                                                          434/236

(Continued)

FOREIGN PATENT DOCUMENTS

JP           2005202619 A  *  7/2005  ............. G06F 17/60

OTHER PUBLICATIONS

• DeFranzo, Susan E. Lower Online Survey Abandonment with 4 Strategies. (Sep. 12, 2013) . Retrieved online Dec. 25, 2017. https://www.snapsurveys.com/blog/online-survey-abandonment-4-strategies/.*

(Continued)

*Primary Examiner* — James A Reagan
(74) *Attorney, Agent, or Firm* — Hayes Soloway P.C.

(57) ABSTRACT

System and method for facilitating an interactive engagement of a user with an online application is disclosed. The method comprises presenting one or more first questions, to the user, associated with the online application. For the one or more first questions, a first response is received from the user. The first response indicates behavioral characteristics of the user. The method comprises assigning a first engagement metric based on the first response. Further, one or more second questions are presented, to the user, associated with the online application. The one or more second questions are dynamically restructured based on the first engagement metric. The method comprises receiving a second response corresponding to the one or more second questions. The method further comprises modifying the first engagement metric into a second engagement metric based on the second response. The method further comprises calculating a score based on the second engagement metric.

20 Claims, 6 Drawing Sheets

(58) Field of Classification Search
USPC .................................................. 705/14.17
See application file for complete search history.

(56) References Cited

U.S. PATENT DOCUMENTS

| | | | |
|---|---|---|---|
| 2010/0331064 A1 | 12/2010 | Michelstein et al. | |
| 2012/0324353 A1* | 12/2012 | Torbey .................... | G06F 3/048 715/716 |
| 2013/0073388 A1* | 3/2013 | Heath .................... | G06Q 30/02 705/14.53 |
| 2013/0257876 A1* | 10/2013 | Davis ...................... | A63F 13/12 345/473 |

OTHER PUBLICATIONS

Adrián Domínguez, Joseba Saenz-De-Navarrete, Luis De-Marcos*, Luis Fernández-Sanz, Carmen Pagés, José-Javier Martínez-Herráiz, "Gamifying learning experiences: Practical implications and outcomes", Computers & Education 63 (2013) 380-392.

"Gamification and Workplace Behavior Modification" Podcast Transcript 2012, Accenture.

Siobhan O'Donovan, "Gamification of the Games Course", University of Cape Town (Summer Undergraduate Research Experience).

Takeshi Chusho, Katsuya Fujiwara, and Keiji Minamitani, "Automatic Filling in a Form by an Agent for Web Applications", Department of Computer Science, School of Science and Technology, Meiji University, Japan.

Marnizapin, "Using Gamification in Online Surveys" Mar. 13, 2013.

* cited by examiner

US 9,977,562 B2

SYSTEM AND METHOD FOR FACILITATING AN INTERACTIVE ENGAGEMENT OF A USER WITH AN ONLINE APPLICATION

PRIORITY CLAIM

The present application claims priority from an Indian provisional patent application 1839/MUM/2013, filed on Jun. 24, 2013.

TECHNICAL FIELD

The present disclosure in general relates to user interaction with an online application. More particularly, the present disclosure relates to a system and method for facilitating an interactive engagement of a user with the online application.

BACKGROUND

Users may perform several activities using online applications, for example, web server-based applications. Most of the server-based applications require the users to submit one or more forms comprising user details to the server corresponding to the online applications. For example, the online applications may comprise registration for a service, online account opening, a loan application, taxes, bill payments, online ticket booking, e-commerce, etc. Often, the online applications are presented to the users in a form of an HTML form.

The users accessing the web-server based applications over internet are presented with online forms which are required to be filled by the users. The online forms may comprise one or more fields. The users may fill the online forms with user details in respective fields. Filling of the online forms is often tedious, require duplication of user details to be filled at different fields and takes considerable effort each time the user interacts with the web-server based applications. In order to address issues related to filling of the online forms, researches have proposed use of an automated form filling. The automatic form filling addresses issues of filling the online forms by replicating the user details in relevant fields from a previous field having similar user details. The automated form filling then takes information from the user's profile and automatically completes the form with the requested information. However, the current approach of application process is extensive and takes considerable time. Therefore, the user may not provide adequate user details for the respective fields and are prone to abandonment.

With the advent of the Internet, currently organizations are providing the online applications that actively engage the user to fill the application form with user details/information. However, with several online applications requiring mandatory fields to be filled and documents/records to upload, the online form filling does not provide effective user experience.

SUMMARY

This summary is provided to introduce concepts related to systems and methods for facilitating an interactive engagement of a user with an online application and the concepts are further described below in the detailed description. This summary is not intended to identify essential features of the claimed subject matter nor is it intended for use in determining or limiting the scope of the claimed subject matter.

In one implementation, a method for facilitating an interactive engagement of a user with an online application is disclosed. The online application comprises a plurality of questions. The method comprises presenting one or more first questions of the plurality of questions, to the user, associated with the online application. The method further comprises receiving a first response, from the user, corresponding to the one or more first questions. The first response indicates behavioural characteristics of the user. The method further comprises assigning a first engagement metric, of the user, based on the first response. The method further comprises presenting one or more second questions, to the user, associated with the online application. The one or more second questions are dynamically restructured based on the first engagement metric. The method further comprises receiving a second response, from the user, corresponding to the one or more second questions. The method further comprises modifying the first engagement metric into a second engagement metric based on the second response. The method further comprises calculating a score based on the second engagement metric. The method further comprises presenting the score to the user, on a user interface, such that the interactive engagement of the user is enhanced during the interaction with the online application. The presenting the one or more first questions, the receiving the first response, the assigning, the presenting one or more second questions, the receiving the second response, the modifying, the calculating and the presenting of the score is performed by a processor using programming instructions stored in a memory. The method further comprises presenting incentives to the user based on the first engagement metric. The method further comprises presenting disincentives to the user based on the first engagement metric. The method further comprises calculating an abandonment metric based on the first engagement metric.

In one implementation, a system for facilitating an interactive engagement of a user with an online application is disclosed. The online application comprises a plurality of questions. The system comprises a processor and a memory coupled to the processor. The processor executes a plurality of modules stored in the memory. The plurality of modules comprises a first presenting module to present one or more first questions of the plurality of questions, to the user, associated with the online application. The plurality of modules comprises a first reception module to receive a first response, from the user, corresponding to the one or more first questions. The first response indicates behavioural characteristics of the user. The plurality of modules further comprises an assigning module to assign a first engagement metric, of the user, based on the first response. The plurality of modules further comprises a second presenting module to present one or more second questions, to the user, associated with the online application. The one or more second questions are dynamically restructured based on the first response. The plurality of modules further comprises a second reception module to receive a second response, from the user, corresponding to the one or more second questions. The plurality of modules further comprises an analysing module to modify the first engagement metric into a second engagement metric based on the second response. The analysing module further calculates a score based on the second engagement metric. The analysing module further presents the score to the user, on a user interface, such that the interactive engagement of the user is enhanced during the interaction with the online application. The second presenting module further presents incentives to the user based on the first engagement metric. The second presenting module further presents disincentives to the user based on the first engagement metric. The second presenting module further determines an abandonment metric based on the first engagement metric, In one implementation, a non-transitory computer readable medium embodying a program executable in a computing device for facilitating an interactive engagement of a user with an online application is disclosed. The online application comprises a plurality of questions, The program comprises a program code for presenting one or more first questions of the plurality of questions, to the user, associated with the online application. The program further comprises a program code for receiving a first response, from the user, corresponding to the one or more first questions. The first response indicates behavioural characteristics of the user. The program further comprises a program code for assigning a first engagement metric, of the user, based on the first response. The program further comprises a program code for presenting one or more second questions, to the user, associated with the online application. The one or more second questions are dynamically restructured based on the first engagement metric. The program further comprises a program code for receiving a second response, from the user, corresponding to the one or more second questions. The program further comprises modifying the first engagement metric into a second engagement metric based on the second response. The program further comprises a program code for calculating a score based on the second engagement metric. The program further comprises a program code for presenting the score to the user, on a user interface, such that the interactive engagement of the user is enhanced during the interaction with the online application.

BRIEF DESCRIPTION OF DRAWINGS

The detailed description is described with reference to the accompanying figures. In the figures, the left-most digit(s) of a reference number identifies the figure in which the reference number first appears. The same numbers are used throughout the drawings to refer like features and components.

DETAILED DESCRIPTION

The present disclosure relates to systems and methods for facilitating an interactive engagement of a user with an online application. The user engagement may be enhanced by utilizing various segments of user behaviour and by utilizing a plurality of gaming techniques and social network interactions. In order to provide the interactive engagement of the user with the online application comprising a plurality of questions. At first, the user may be presented with one or more first questions of the plurality of questions. For each first question of the one or more first questions, a first response is received from the user. The first response indicates behavioural characteristics of the user. Based on the first response, a first engagement metric is assigned. Further, one or more second questions associated with the online application are presented to the user. The one or more second questions are dynamically restructured based on the first engagement metric. For each second question of the one or more second questions, a second response is received from the user. The first engagement metric is modified into a second engagement metric based on the second response. Based on the second engagement metric, a score is calculated for the online application. In the end, the score is presented to the user on a user interface.

While aspects of described system and method for facilitating an interactive engagement of a user with an online application may be implemented in any number of different computing systems, environments, and/or configurations, the embodiments are described in the context of the following exemplary system.

Figure 1:
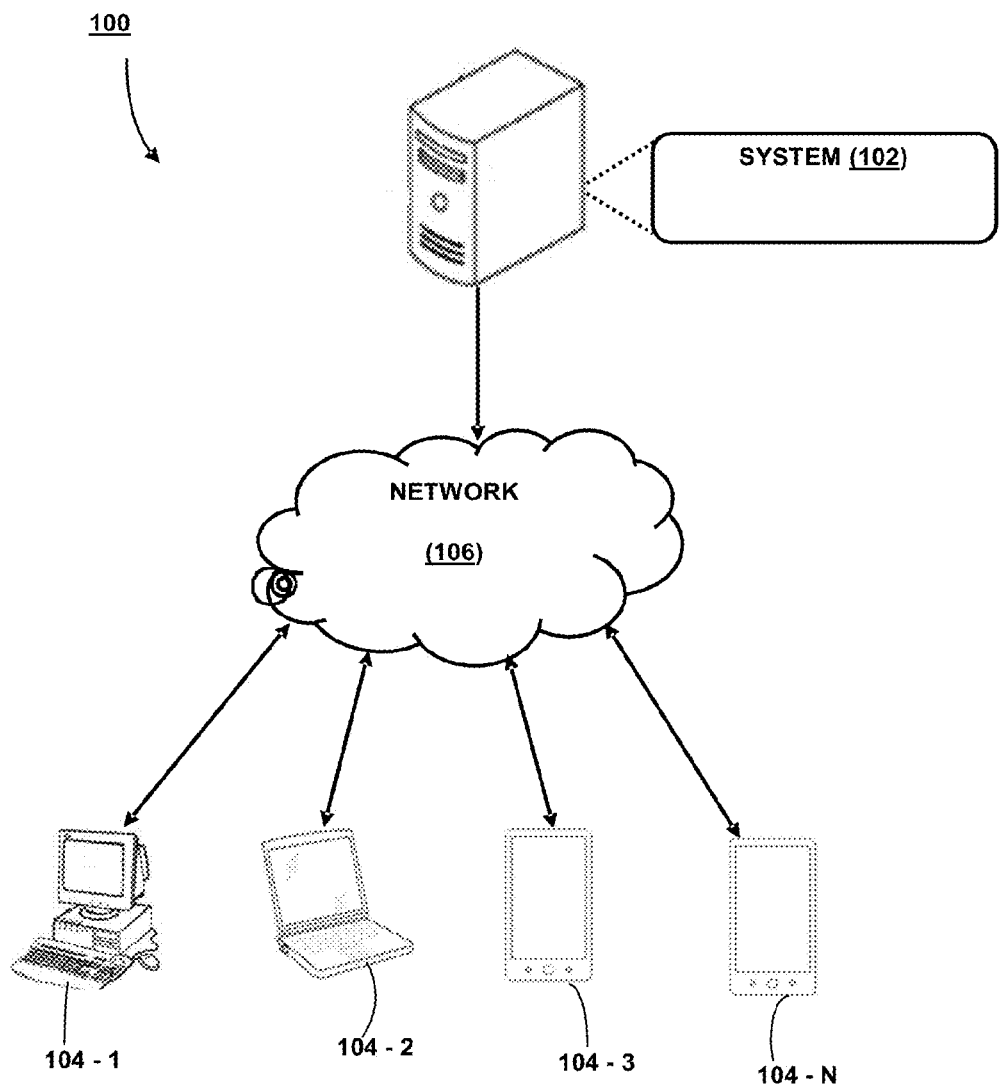
FIG. 1 illustrates a network implementation of a system for facilitating an interactive engagement of a user with an online application, in accordance with an embodiment of the present disclosure.

Referring now to FIG. 1, a network implementation 100 of a system 102 for facilitating an interactive engagement of a user with an online application is illustrated, in accordance with an embodiment of the present disclosure. The system 102 may present one or more first questions to the user, associated with the online application. The system 102 may receive a first response from the user, corresponding to each first question of the one or more first questions. The system 102 may assign a first engagement metric based on the first response. Subsequently, based on the first response, the system 102 may present one or more second questions, to the user, associated with the online application. The one or more second questions may be dynamically restructured/realigned/rearranged based on the first engagement metric. The system 102 may receive a second response corresponding to the one or more second questions from the user. The system 102 may modify the first engagement metric into a second engagement metric based on the second response. Upon obtaining the second engagement metric, the system 102 may calculate a score based on the second engagement metric. Further, the system 102 may present the score to the user on a user interface.

Although the present disclosure is explained by considering a scenario that the system 102 is implemented as an application on a server. It may be understood that the system 102 may also be implemented in a variety of computing systems, such as a laptop computer, a desktop computer, a notebook, a workstation, a mainframe computer, a server, a network server, and the like. It will be understood that the system 102 may be accessed by multiple users through one or more user devices 104-1, 104-2 . . . 104-N, collectively referred to as user devices 104 hereinafter, or applications residing on the user devices 104. Examples of the user devices 104 may include, but are not limited to, a portable computer, a personal digital assistant, a handheld device, and a workstation. The user devices 104 are communicatively coupled to the system 102 through a network 106.

In one implementation, the network 106 may be a wireless network, a wired network or a combination thereof. The network 106 can be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP/HTTPS), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like.

Figure 2:
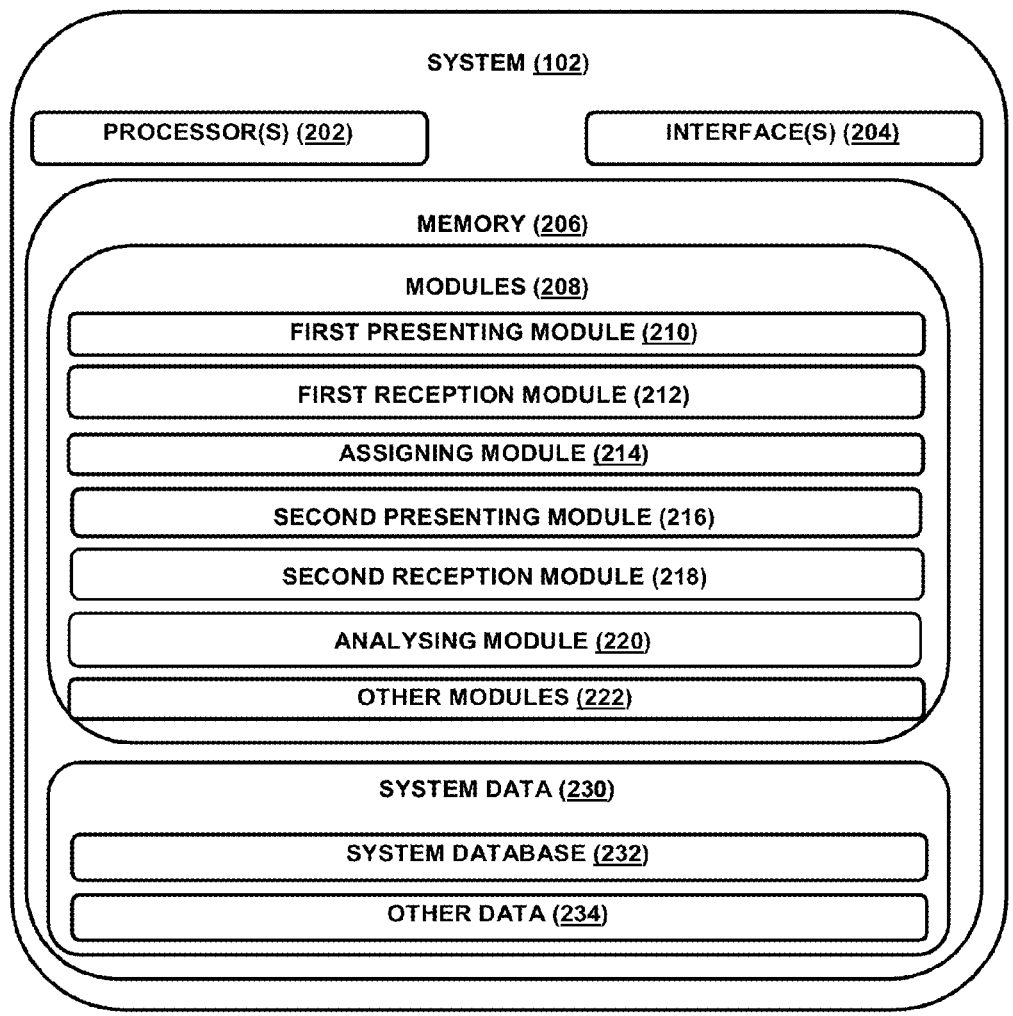
FIG. 2 illustrates the system, in accordance with an embodiment of the present disclosure.

Referring now to FIG. 2, the system 102 is illustrated in accordance with an embodiment of the present disclosure. In one embodiment, the system 102 may include at least one processor 202, an input/output (I/O) interface 204, and a memory 206. The at least one processor 202 may be implemented as one or more microprocessors, microcomputers, microcontrollers, digital signal processors, central processing units, state machines, logic circuitries, and/or any devices that manipulate signals based on operational instructions. Among other capabilities, the at least one processor 202 is configured to fetch and execute computer-readable instructions stored in the memory 206.

The I/O interface 204 may include a variety of software and hardware interfaces, for example, a web interface, a graphical user interface, and the like. The I/O interface 204 may allow the system 102 to interact with a user directly or through the user devices 104. Further, the I/O interface 204 may enable the system 102 to communicate with other computing devices, such as web servers and external data servers (not shown). The I/O interface 204 may facilitate multiple communications within a wide variety of networks and protocol types, including wired networks, for example, LAN, cable, etc., and wireless networks, such as WLAN, cellular, or satellite. The I/O interface 204 may include one or more ports for connecting a number of devices to one another or to another server.

The memory 206 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 206 may include modules 208 and system data 230.

The modules 208 include routines, programs, objects, components, data structures, etc., which perform particular tasks or implement particular abstract data types. In one implementation, the modules 208 may include a first presenting module 210, a first reception module 212, an assigning module 214, a second presenting module 216, a second reception module 218, an analysing module 220, and other modules 222. The other modules 222 may include programs or coded instructions that supplement applications and functions of the system 102.

The system data 230, amongst other things, serves as a repository for storing data processed, received, and generated by one or more of the modules 208. The system data 230 may also include a system database 232 and other data 234. The other data 234 may include data generated as a result of the execution of one or more modules in the other modules 222.

In one implementation, at first, a user may use the client device 104 to access the system 102 via the network 106. The working of the system 102 may be explained in detail using FIG. 2, FIG. 3A, FIG. 3B, FIG. 3C and FIG. 3D explained below. The system 102 may be used for facilitating the interactive engagement of the user with the online application. The online application may comprise a plurality of questions. The plurality of questions may be presented to receive user details/information from the user corresponding to the online application. The online application may comprise an application that requires the user to provide the user details/information. The system 102 provides the user interface through which the user may access the online application. The user may complete the online application and may receive information regarding a benefit. In one example, the online application may comprise a loan application corresponding to a bank. In another example, the online application may comprise an application for registering the user in a portal/database. In another example, the online application may comprise a registration of the user for a service.

In order to collect the user details/information from the user corresponding to the online application, the system 102 may present one or more first questions to the user. Specifically, the system 102 may employ the first presenting module 210 to present the one or more first questions to the user. The one or more first questions may be associated with the online application. In one example, the one or more first questions may comprise at least one of a first question, such as determine mood of the user. In another example, the first question may include determine attention/focus/drowsiness level of the user. In another example, the first question may include urge of the user to interact with the online application. In one example, the first question may include willingness of the user to disclose the information that may be personally identifiable, or willingness of the user to disclose the information that is non personally identifiable or a level of disclosure. In one example, the one or more first questions may comprise a name, a gender, an address such as home address and office address, date of birth, nationality, residency status, ethnicity, income range, a telephone number of the user. In another example, the one or more first questions may comprise employee details of the user. The employee details may comprise an employee identification number, name of the employer, designation of the employee and work email address. The one or more first questions may vary with respect to the online application.

Upon presenting the one or more first questions to the user, the user may respond to the one or more first questions. The system 102 may receive a first response for each first question of the one or more first questions from the user. In one example, the system 102 may employ the first reception module 212 to receive the first response. The first response may indicate behavioural characteristics of the user. In one implementation, the behavioural characteristics may be obtained from browsing history or navigation habits of the user from the user/client device 104. In one example, the browsing history or navigation habits of the user may be obtained through agents. In one implementation, the behavioural characteristics may be obtained without presenting the one or more first questions to the user. The behavioural characteristics may comprise at least one of a level of personal details disclosure, participation of the user in a crowd sourced platform, use of a social network by the user for responding to the first question, an attention/confusion level of the user, the navigation habits of the user on the user/client device 104, and a decision making level of the user. In one example, the user may be presented the first question for determining mood of the user. For example, the user may be presented with the first question as how are you.

In another example, the user may be presented with a greeting for the day, providing a choice to select a gift, and so on.

For the first questions, the user may provide responses. The first reception module 212 may receive the first response corresponding to the first question. In one example, for the first question, how are you, the first reception module 212 may receive the first response as I'm good from the user. Similarly, in order to understand the behavioural characteristics of the user, the first question such as salutation/greeting, picking a gift to a peer and other parameters may be presented to the user. In one example, for the first question colour of the day, the first reception module 212 may receive the first response as Blue. Similarly, for each of the first question, the first reception module 212 may receive the first response. Presentation of other parameters to understand the behavioural characteristics of the user that are not disclosed is obvious to persons skilled in the art. In one example, consider the first question as name of the user. For the first question, the user may provide the first response as Ravi. In another example, for the first question, the gender, the user may provide the first response as male. In another example, for the first question, the address, the user may provide the first response as street number 20, area 11, Jayanagar, Bangalore. Similarly, for each of the one or more first questions, the user may provide the first response.

The level of personal details disclosure may indicate disclosure of the user details/information, by the user against an expected response for the first question. For example, consider the first question is presented as the name of the user. The name of the user may comprise a first name and a last name. For the first question, the user may provide the first response to the first name as Ravi and may not disclose the last name. Similarly, for one or more first questions comprising the first questions e.g. the name, an e-mail address, an income range, ethnicity, employer details, work email, and the telephone number, the first response for each of the first questions may be determined based on the information disclosed by the user.

The participation of the user in crowd sourced initiative may indicate the user requesting one or more peers for the user details/information for responding to the first question. For example, consider the first question comprises a postal code. The user may request the one or more peers in the crowd sourced platform for the postal code of the user residing in a locality. The user may receive the information corresponding to the postal code, i.e. the first response e.g. 560011 from the one or more peers from the crowd sourced platform. Upon receiving the postal code of the locality, the user may use the postal code to provide the first response for the first question. Use of the crowd sourced platform by the user for obtaining the information, to provide the first response for the first question may be determined by calculating number of times the user requested the crowd sourced platform for the first response.

The use of social network may indicate the user requesting another user for providing the first response for the first question. The social network may comprise applications connecting users across a network of connections. For example, the social network may comprise Facebook®, Google+®, Twitter®, LinkedIn® and MySpace®. For example, consider the first question comprises a nearest bank. The user may request another user on the social network for the nearest bank of the user residing in the locality. The user may receive the user details/information corresponding to the nearest bank, i.e. the first response from another user. Upon receiving the user details/information corresponding to the nearest bank in the locality, the user may use the user details/information of the nearest bank to provide the first response for the first question. Use of the social network by the user for obtaining the user details/information, to provide the first response for the first question may be determined by calculating number of times the user requested another user on the social network to provide the first response.

The attention/confusion level of the user may correspond to reaction/response time taken to provide the first response for the first question by the user. In one example, the user may be presented to respond to a CAPTCHA as the first question. For the CAPTCHA, reaction/response time taken or minimum attempts the user may have taken to provide the first response may be determined. In one example, an audio file, a text file, an image or multimedia CAPTCHAs may be presented to the user. In another example, the system 102 may assess drowsiness level of the user. The system 102 may access the drowsiness level of the user through non-invasive methods such as by monitoring the number of eye blinks, gaze, and constriction/dilation of eye pupil, facial expressions through a camera attached/connected to the user/client device 104.

The navigation habits of the user on the user/client device may indicate the first response provided by the user for similar one or more first questions in the online applications. For example, pace/speed at which the user is filling the first response for the corresponding first question may be accessed. In one example, number of the first questions the user did not provide the first response may be accessed. Further, number of times the user scrolls up and/or down, or swipes back and forth, for providing the first response for the first question may be accessed. In one example, the number of times the user skipped the first question without providing the first response may be accessed. The first questions that the user may have skipped may be presented at a later stage in the online application. In one example, time taken to resume for providing the first question for the first question that was not answered may also be accessed.

After receiving the first response, for each first question of the one or more first questions, the system 102 may assign a first engagement metric/index based on the first response. The first engagement metric may indicate the user responding/answering with the first response for the first question. In one implementation, the system 102 may employ the assigning module 214 to assign the first engagement metric/index based on the first response. In one example, for the first question, name, the engagement metric/index 10 may be assigned by the assigning module 214. In another example, for the first question, work email-address, the engagement metric/index 20 may be assigned by the assigning module 214. The engagement metric/index may be determined based on complexity of the first question. For example, the first question that may likely take longer duration to provide the first response may have higher engagement metric/index. In one example, the first question address may take longer duration when compared to email address for receiving the first response. Therefore, the first question address may have higher engagement metric/index. In another example, the first question that the user most likely to abandon may have higher engagement metric/index in comparison to a question that the user is most likely to answer. In another example, the first question that is priority/mandatory to obtain the user details/information may have higher engagement metric/index. It is to be understood that the engagement metric/index may vary for each first question of the one or more first questions as may be determined by the user and such assignment is obvious to the persons skilled in the art.

In one implementation, in order to enhance the engagement metric/index of the user, the user may hover a cursor/point/gesture using the user/client device on the one or more first questions. By hovering the cursor/mouse/gesture on the one or more first questions, the user may provide the first response corresponding to the first question having higher engagement metric/index. For example, consider for the first question, e-mail address comprises the engagement metric/index 10 and for the first question, the telephone number comprises the engagement metric/index 20. The user may hover over each of the first questions and provide the first response for the telephone number followed by the address to obtain higher engagement metric/index.

Figure 3A:
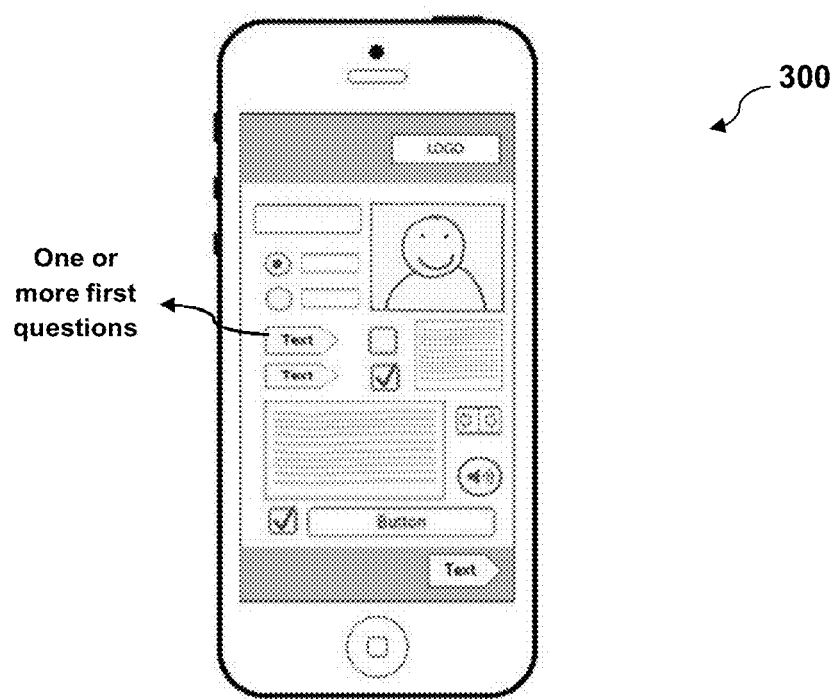
FIG. 3A, illustrates presentation of one or more first questions on a user interface, in accordance with an embodiment of the present disclosure.

After assigning the engagement metric/index based on the first response, the system 102 may employ the second presenting module 216 to present one or more second questions to the user. The one or more second questions may associate with the online application. Based on the first engagement metric/index corresponding to the first question, the second question of the one or more second questions may be restructured/realigned/rearranged. In order to explain the restructuring/realigning/rearranging of the one or more second questions based on the first response, FIG. 3A, FIG. 3B, FIG. 3C, and FIG. 3D and Table 1 may be used as an example. In one example, the one or more first questions such as mood of the user, gender, location may be presented on the user interface as shown in FIG. 3A. Table 1 shows the one or more first questions and one or more second questions to illustrate the presentation of questions in the online application.

TABLE 1

Table 1: One or more first questions and one or more second questions

Figures 3B, 3C, 3D:
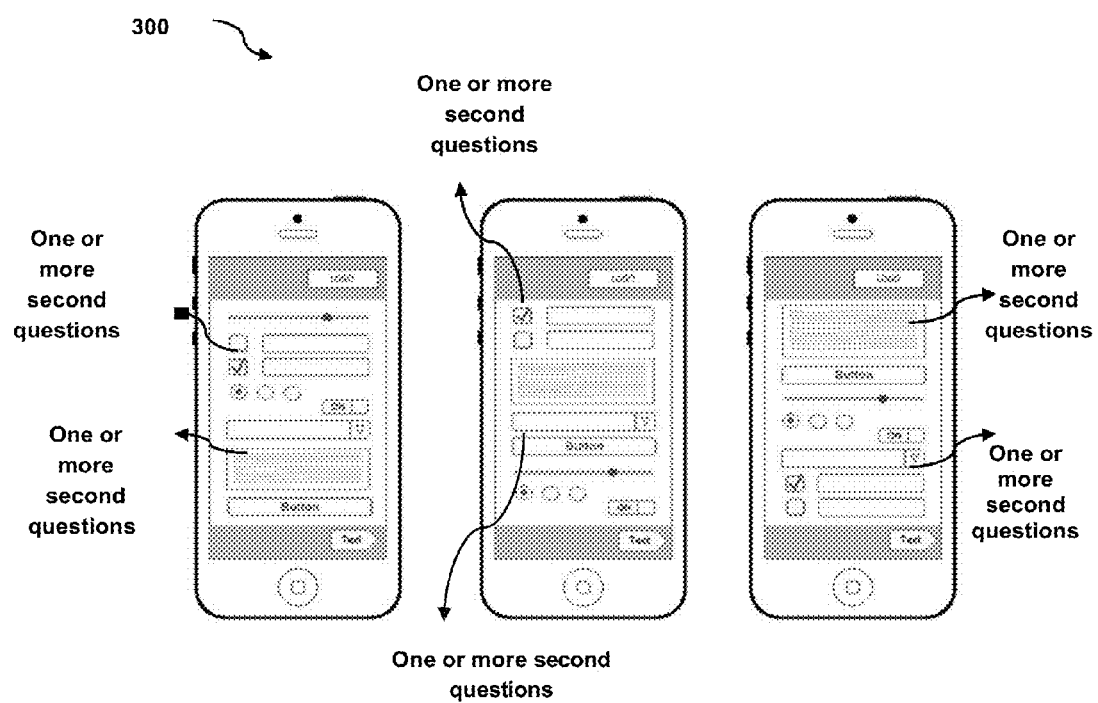
FIG. 3B, FIG. 3C and FIG. 3D illustrate presentation of one or more second questions on a user interface in various configurations, in accordance with one or more embodiments of the present disclosure.

Name:
Address:
Nationality:
Date of birth:
E-mail address:
Photo identity:
Upload photo:
Passport:
Driving License:

In one example, referring to Table 1, consider that the first presenting module 210 presents the first question name. Further, consider the one or more second questions comprise the second questions in an order, such as address, nationality, date of birth, and so on. The one or more first questions and one or more second questions as shown in the Table 1 may be presented on the user interface of the user/client device 104, as shown in FIG. 3B. For the first question, i.e. name, the user may provide the first response as Ravi. Based on the first response received by the first reception module 212, the assigning module 214 may assign the first engagement metric/index, e.g. 10. In one implementation, based on the first engagement metric/index, the second presenting module 216 may present the one or more second questions. The second presenting module 216 may present the second question based on variety of parameters. In one example, the second presenting module 216 may present the second question that the user most likely to answer. The second question may depend on the first engagement metric/index of the user for the one or more first questions presented earlier. In one example, the second question having higher engagement metric/index may be presented, at first, in the order of the one or more second questions. In one example, for the second question presented at first in the order, if the second reception module 216 does not receive the second response, then the second question may be presented at a later stage of the online application. In order to enhance/increase the engagement metric/index, the user may choose to provide the response for the questions that have high engagement index.

Upon presenting the one or more second questions, the second reception module 218 may receive the second response from the user, corresponding to the one or more second questions. For the above example, consider that the second presenting module 216 may have restructured/realigned/rearranged the one or more second questions, in the order address, e-mail address, photo identity, date of birth, and so on. For the second question in the order of the one or more second questions, the second reception module 218 may receive the second response from the user. For the second question i.e. address, the second reception module 218 may receive the second response as street number 20, area 11, Jayanagar, Bangalore.

After receiving the second response for the second question, the engagement metric/index may be calculated for the questions that have received the responses. In order to calculate the engagement metric/index for the questions that have received the responses, a weighted average may be calculated. In other words, the questions that have received the responses may be considered as the one or more first questions and the engagement metric/index may be calculated by calculating the weighted average of the engagement metric/index for each of the questions. In one implementation, the system 102 may employ the analysing module 220 to modify the first engagement metric/index into a second engagement metric/index. The second engagement metric/index indicates the weighted average of the engagement metric/index for the questions that the user may have provided the responses. As presented above, the engagement metric/index for the second response may be assigned e.g. 10. Further, for the subsequent questions in the online application, the questions name and address may be considered as the one or more first questions. Considering the first response for name, and the second response for address, the first engagement metric/index may be modified. For the questions, the system 102 may employ the analysing module 220 to modify the first engagement metric/index into the second engagement metric/index based on the second response. The second engagement metric/index may be determined by calculating the weighted average of the engagement metric/index. For the above example, the first engagement metric/index assigned to each of the first question or the second question as shown in Table 1 may comprise name 10, address 20, nationality 5, date of birth 10, e-mail address 20. For the questions name and address, the engagement metric/index is 10 and 20 respectively. For the questions, the engagement metric/index may be determined as 15. Further, the subsequent questions in the online application may be restructured/realigned/rearranged.

In another example, for the first question as shown in Table 1, i.e. name, the user may provide the first response as Ravi. Based on the first response, the assigning module 214 may assign the first engagement metric/index, e.g. 10. Based on the first response, the second presenting module 216 may present the one or more second questions. Upon presenting the one or more second questions, the second reception module 218 may receive the second response from the user, corresponding to the one or more second questions. For the above example, consider that the second presenting module 216 may have restructured/realigned/rearranged the one or more second questions, in the order date of birth, e-mail address, address, photo identity, and so on. For the second question in the order of the one or more second questions, the second reception module 218 may receive the second response. For the above example, the second reception module 218 may receive the second response corresponding to date of birth. The one or more second questions restructured/realigned/rearranged based on the first response may be presented as shown Table 2. Further, the one or more first questions and one or more second questions as shown in the Table 2 may be presented on the user interface of the user/client device 104, as shown in FIG. 3B. Subsequently, the second engagement metric/index may be determined based on the first engagement metric/index and the second response for the questions name and data of birth respectively.

TABLE 2

Table 2: One or more second questions restructured/realigned/rearranged based on the first response Name:
Date of birth:
E-mail address:
Address:
Photo identity:
    Upload photo:
    Passport:
    Driving License:
Nationality:

In another example, consider that the second presenting module 216 may have restructured/realigned/rearranged the one or more second questions, in the order photo identity, nationality, date of birth, e-mail address, address, and so on. For the above example, at first, the second reception module 218 may receive the second response corresponding to photo identity. As explained above, for the example, the one or more first questions and one or more second questions may be presented on the user interface of the user/client device 104, as shown in FIG. 3C. Similarly, consider that the second presenting module 216 may have restructured/realigned/rearranged the one or more second questions, in the order nationality, photo identity, address, date of birth, e-mail address, and so on. For the above example, the second reception module 218 may receive the second response corresponding to nationality. For the example, the one or more first questions and one or more second questions may be presented on the user interface of the user/client device 104, as shown in FIG. 3D. Subsequently, the second engagement metric/index may be determined based on the first engagement metric/index and the second response for the questions name and photo identify respectively.

In another example, based on the first response of the user corresponding to the behavioural characteristics, the one or more second questions may be presented to the user. In one example, consider that the system 102 assesses the user to respond to the questions presented in a quick session/fast paced/anxiously, the user may be presented with the second questions that may take less time to provide the second response. For example, the user may be provided with the second questions that require the second response as yes or no, having radio buttons. In another example, if the system 102 assesses the user to be impatient, the second presenting module 216 may present the questions that may require narrative response. Further, if the system 102 assesses the user to be normal-paced, then the second presenting module 216 may present the questions based on the first engagement metric/index.

After determining the second engagement metric/index for the questions that have received the responses, the remaining questions may be restructured/realigned/rearranged in the online application. In one implementation, the user may provide the second response for any of the second question in the one or more second questions. For example, the user may provide the second response for the second question having higher engagement metric/index in order to enhance the interaction with the online application. Based on the second response corresponding to the second question of the one or more second questions and the first engagement metric/index for the one or more first questions, the second engagement metric/index may be determined. The one or more second questions are presented iteratively until the second response corresponding to each second question of the one or more second questions is received from the user. In other words, the restructuring/realigning/rearranging of the one or more second questions may be performed until all of the questions in the online application are completed using the description provided above.

In order to enhance the interactive engagement of the user with the online application, the second presentation module 216 may present incentives to the user based on the first response and the first engagement metric/index. The incentives may be provided to encourage/persuade/motivate the user to present the second response corresponding to the second question in the online application. In one example, for the loan application, based on the first engagement metric/index, the user may be provided with a discount on an interest rate applicable corresponding to the loan application. In one example, the incentives may be provided for the second question that may have more engagement metric/index or less engagement metric/index. For the second response received corresponding to the second question, the user may be awarded with the incentives. For example, considering the example as presented in Table 1, for the second question comprising photo identity, if the user uploads a photo corresponding to the upload photo, the user may be awarded with the incentives of 5. Further, if the user provides passport ID, the user may be provided with the incentives of 10. In one example, the incentives may comprise virtual currency, experience points, character levels, character attributes, virtual items, reward points, progression, badges, temporary credit rise, gift coupon or other in-application assets. In another example, the incentives may be awarded based on the time taken to provide the response for the second question. In another example, the incentives may depend on the time taken between two or more consecutive first responses for the one or more first questions.

In one implementation, the incentives may be presented in a variety of ways. For example, the incentives may be presented statically, randomly, or dynamically. In one example, the incentives may be pre-set and may be presented corresponding to the first question of the one or more first questions. In one example, the incentives may be presented dynamically, such that the incentives presented may vary based on a variety of factors. For example, the incentives may be determined based on the first response, or the first engagement metric/index for the one or more second questions, or other parameters that may be obvious to persons skilled in the art.

In order to enhance the interactive engagement of the user with the online application, the second presentation module 216 may present disincentives to the user based the first engagement metric/index. In one example, the disincentives may be awarded based on the time taken to provide the first response for the first question. In another example, the disincentives may depend on the time taken between two or more consecutive first responses for the one or more first questions. In another example, the disincentives may be awarded for not utilizing the incentives presented as a reward for providing the first response in a timely manner.

In one implementation, the system 102 may employ the second presenting module 216 to calculate an abandonment metric/index for the one or more second questions. The abandonment metric/index may be used to determine the incentives so as to position a specific second question in the online application. The one or more second questions are positioned in an order based on predetermined risk of abandonment of a question and the second engagement metric/index of the user. The abandonment metric/index may be calculated to enhance the interactive engagement of the user. The user may provide the second response for the one or more second questions that has higher abandonment metric/index such that the engagement metric/index remains high. For example, the questions that the user most likely to provide the response may be positioned on top in the second questions. In another example, the questions the user most likely to skip may be positioned at the end of the online application.

In one implementation, the abandonment metric/index may be presented for the one or more second questions that the user may less likely to provide the second response. In order to enhance the user engagement metric/index, the one or more second questions that the user may less likely to provide the second response may be provide with more/higher incentives. In one implementation, the abandonment metric/index may be calculated using at least one of a machine learning technique and a data mining technique. In one example, the abandonment metric/index may be calculated using a supervised or unsupervised learning technique, or a clustering, deep learning algorithm, or a decision tree. In one example, the abandonment metric/index may be calculated based on a data from previous history that may be similar to the online application. For example, consider the loan application, for the second question comprising salary details and pay-slips, the user may not provide the user details/information. In such a case, for the second question comprising salary details and pay-slips, the abandonment metric/index 0.85 may be assigned. Similarly, for the second question, secondary details may be assigned with the abandonment metric/index 0.5. In order to obtain the higher engagement metric/index, the user may present the second response for the second question having the abandonment metric/index 0.85. In one example, by providing the second response for the second question with the abandonment metric/index 0.85, the user may be presented with the incentives. For example, if the user provides the second response for the salary details, the user may be presented the incentives of 20.

The abandonment metric/index may be presented to improve/enhance the interactive engagement of the user with the online application. The abandonment metric/index may be presented to improve completeness of the online application by positioning the incentives or the disincentives for the second questions to entice the user to take the incentives. In one implementation, based on the second engagement metric/index and a rate at which the online application receives the second response, the abandonment metric/index may be determined dynamically. The presentation of the one or more second questions with the abandonment metric/index may be determined using machine learning techniques known in the art.

After determining the second engagement metric/index of the user, the system 102 may employ the analysing module 220 to calculate a score for the online application. The score may be calculated based on the second engagement metric/index. In one implementation, the score may be calculated based on the second engagement metric/index, the second responses the user provided for the second that has been determined as complex. In one implementation, the score may be calculated based on the second engagement metric/index and the rate/speed at which the user provided the second response for the second question of the one or more second questions. In one example, the score may be calculated based on the second response, the second engagement metric/index and the incentives. In one example, the score may be calculated based on the second response, the second engagement metric/index, the incentives and the disincentives. After calculating the score, the score may be presented to the user on the user interface. In one implementation, the score may be presented on the user interface. By presenting the score on the user interface, the user may be motivated/encouraged/persuaded to provide the second response in less time and may enable/make the user to complete the online application in a shorter timeframe. Presenting the score on the user interface may reduce turnaround time for the online application thereby enhancing the engagement of the user with the online application.

Figure 4A:
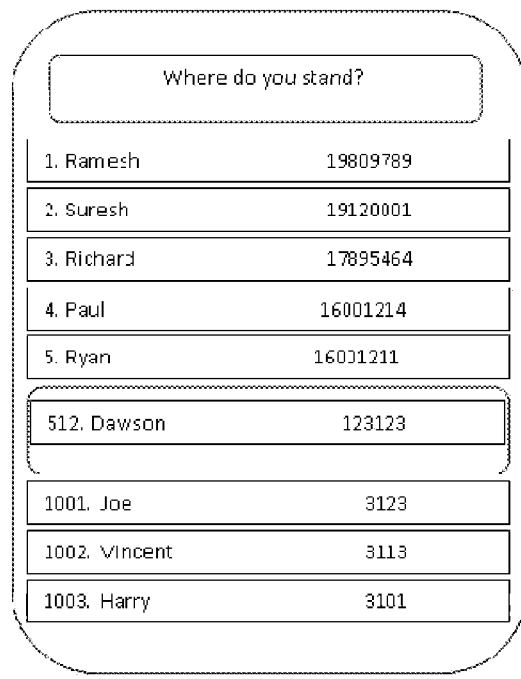
FIG. 4A illustrates an example of comparing and displaying of a score and a peer score on the user interface, in accordance with an embodiment of the present disclosure.
Figure 4B:
FIG. 4B illustrates an example of displaying a status/progress bar on the user interface, in accordance with an embodiment of the present disclosure.

Based on the completeness of the online application, the system 102 may employ the analysing module 220 to display a status/progress bar in real-time. The status/progress bar may indicate the number of responses the user may have provided for the questions in the online application. For example, the analysing module 220 may display the completeness of the loan application and the loan application procedure to the user using the status/progress bar. In one example, the status/progress bar may be displayed on the user interface as shown in FIG. 4B. The dark shade in the FIG. 4B may indicate the percentile of the completeness of the online application. Further, remaining portion in the bar may indicate the questions that are yet to be provided with the responses. In one example, the status/progress bar may be presented for a stage in the online application. Each stage may indicate a category of the second questions in the online application. Similarly, the status/progress bar may be provided in variety of ways.

In one implementation, the score may be increased based on the completion of the each stage in the online application. In one example, if the user completes the stage salary details in two minutes, the score may be increased from 350 to 375. In another example, in order to enhance the user engagement for the loan application, if the user has high score, the user may be offered with a lower interest rate on the loan or an additional free percentage in home mortgage insurance. In one example, higher the score, the score indicates genuineness/reputation of the user.

In one implementation, the system 102 may interact with other online application through a social network. In one example, the social network may comprise Facebook®, Google+®, Twitter®, LinkedIn® and MySpace®. In one embodiment, the user may request another user to provide the first response or the second response in case the user does not have the user details/information for the first question or the second question. In one implementation, the user may be provided with the incentives if the user receives the second response from another user through the social network. Further, the user may be presented with the disincentives in a case the user does not accept the second response from another user. In one implementation, the second response received from another user through the social network may be auto-filled in the online application. The auto-filling of the first response corresponding to the first question may be performed using techniques known in the art. In one implementation, the user may perform a search on the social network for another user with similar user details/information. Upon finding another user on the social network, the user may request another user to provide the second response for the second question.

In another implementation, the user may utilize integration of the system 102 with the social network to compare the second engagement metric/index or the score with another user. In one example, the system 102 may employ the analysing module 220 to compare the second engagement metric/index with a peer metric/index. The peer metric/index may indicate a metric/index corresponding to another user. In another example, the analysing module 220 may compare the score of the user with a peer score. The peer score may indicate the score of another user.

After comparing the score and the peer score, the analysing module 220 may display the peer score on the user interface of the user. In one implementation, the analysing module 220 may display the score and the peer score in an ascending order or a descending order. In one example, the user score may be compared with multiple users on the social network. The score and the peer score may be displayed on a leader board. The displaying of the score and the peer score in the ascending order may be illustrated with the help of FIG. 4. For example, consider, name of the user is Paul, the score of the user 16001214 may be compared with the multiple users on the social network and may be displayed on the user interface of the user/client device 104. The comparison of the score and the peer score may be displayed based on variety of parameters. In one example, the score and the peer score may be compared based on demography/location of the user and another user. For example, the score and the peer score may be compared for the user and multiple users in Bangalore. In one implementation, the system 102 may detect the location of the user by accessing a location of the user/client device. In another example, the score and the peer score may be compared based on a level of completion of the online application. In another example, the score and the peer score may be compared based on the time taken to complete the online application. In another example, the score and the peer score may be compared based on number of documents uploaded by the user and another user. Although the comparison and displaying of the score and the peer score is presented for the demography, the level of completion and so on, it is obvious to person skilled in the art to compare and display the score and the peer score in variety of ways.

In one implementation, the first response received from the user for the first question of the one or more first questions may be validated by another user of the social network. Similarly, the second response received from the user for the second question of the one or more second questions may be validated by another user of the social network. Further, the system 102 may interact with a third party application to verify correctness of the second response provided by the user. For example, for the question bank identification number, if the user provided the second response as 123645, the system 102 may connect to the third party application such as the bank to verify the correctness of the second response.

In one implementation, the system 102 may be shared across variety of electronic devices. The online application may be resumed from last save point from any of the electronic devices after the user responds to a resumption question. The resumption question may comprise an authentication required to identify the user for proceeding to provide the response for the questions from other electronic devices. The electronic devices may be connected through the wired or wireless networks. For example, the system 102 may be work across devices among the desktop computer, the laptop, the mobile phone and a tablet computer. In one implementation, the user may provide the first response for the one or more first questions using the desktop computer. The user may save the first response for each of the first question he/she provided and may resume using the tablet computer to provide the first response for the remaining questions in the online application. In one implementation, if the system 102 is synced among the electronic devices, the other devices may be notified of the change/update in the online application. The other devices may be notified by way of a push notification, e-mail, SMS, or an alarm reminder. Further, in case the user is inactive for a considerable time, the user may be notified of the inactiveness. The inactiveness or resuming the online application from other electronic devices may be associated with the incentives or disincentives.

In one implementation, the system 102 may store the user details/information in the system database 232. In one implementation, the abandonment metric/index for each question may be retrieved from the system database 232. Further, the information corresponding to the incentives and disincentives provided may also be stored in the system database 232. The information corresponding to the incentives and disincentives may be received based on variety of criteria. In one example, the information may be received based on the navigational habits of the user. In one example, the information may be received for the questions that the user most likely to provide the response using the browsing history of the user. Based on the information, the incentives or disincentives that may have to be provided for the subsequent questions may be determined. In one example, the incentives and disincentives may be provided based on the information corresponding to the abandonment metric/index. In one implementation, the information corresponding to the incentives and disincentives may be determined using the machine learning algorithms presented above.

The system 102 may be implemented in collecting the user details/information and explore the user details/information by introducing gaming techniques such as the incentives, disincentives, points and score and showing the position of the user with respect to other users. The system 102 may store the user details/information such as the responses provided, the incentives and disincentives awarded, documents uploaded, and so on. In one implementation, the system 102 may store a temporary detail (note-it) of the user. The temporary detail may include a note that the user may use to provide the response at a later stage in the online application. In one example, the note may comprise an audio note or a written comment.

In one implementation, the system 102 may provide an option to interact with another user on the social network. For example, the option may comprise a live chat or a loan advisor for the loan application. In one example, considering the loan application, the system 102 may comprise an option for deriving a repayment option for the loan application. The repayment option may comprise the option for calculating the repayment for the loan based on the location of the user.

In one example, the repayment may be calculated based on the salary income of the user. In one example, the system 102 may be integrated with the third party application such as the bank, to provide real-time information based on previous payment details.

Figure 5:
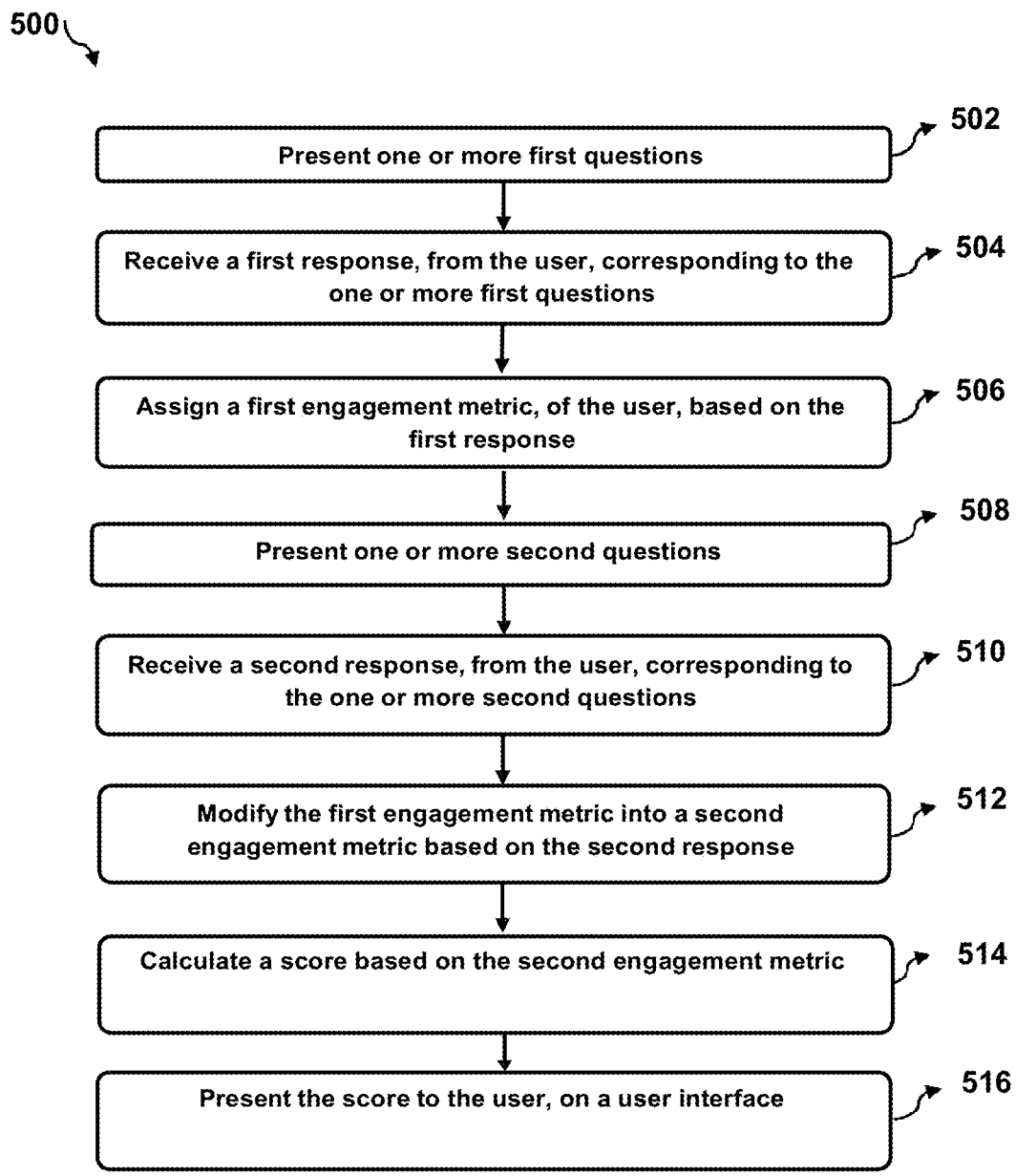
FIG. 5 illustrates a method for facilitating an interactive engagement of a user with an online application, in accordance with an embodiment of the present disclosure.

Referring now to FIG. 5, a method 500 for facilitating an interactive engagement of a user with an online application is shown, in accordance with an embodiment of the present disclosure. The method 500 may be described in the general context of computer executable instructions. Generally, computer executable instructions can include routines, programs, objects, components, data structures, procedures, modules, functions, etc., that perform particular functions or implement particular abstract data types. The method 500 may also be practiced in a distributed computing environment where functions are performed by remote processing devices that are linked through a communications network. In a distributed computing environment, computer executable instructions may be located in both local and remote computer storage media, including memory storage devices.

The order in which the method 500 is described and is not intended to be construed as a limitation, and any number of the described method blocks can be combined in any order to implement the method 500 or alternate methods. Additionally, individual blocks may be deleted from the method 500 without departing from the spirit and scope of the disclosure described herein. Furthermore, the method may be implemented in any suitable hardware, software, firmware, or combination thereof. However, for ease of explanation, in the embodiments described below, the method 500 may be implemented in the above-described system 102.

At step 502, one or more first questions of the plurality of questions may be presented to the user. The one or more first questions may be associated with the online application. In one implementation, the one or more first questions may be presented by the first presenting module 210.

At step 504, for the one or more first questions presented, a first response may be received. In one implementation, the first response may be received by the first reception module 212.

At step 506, based on the first response, a first engagement metric/index of the user may be assigned. In one implementation, the first engagement metric/index may be assigned by the assigning module 214.

At step 508, based on the first response, one or more second questions may be presented to the user. The one or more second questions may be associated with the online application. The one or more second questions are dynamically restructured/realigned/rearranged based on the first engagement metric/index. In one implementation, the one or more second questions may be presented by the second presenting module 216.

At step 510, for each second question of the one or more second questions, a second response may be received from the user. In one implementation, the second response may be received by the second reception module 218.

At step 512, the first engagement metric/index may be modified into a second engagement metric/index based on the second response. In one implementation, the first engagement metric/index may be modified by the analysing module 220.

At step 514, a score is calculated based on the second engagement metric/index. In one implementation, the score may be calculated by the analysing module 220.

At step 516, the score may be presented to the user on a user interface. In one implementation, the score may be presented by the analysing module 220.

Although implementations of system and method for facilitating an interactive engagement of a user with an online application have been described in language specific to structural features and/or methods, it is to be understood that the appended claims are not necessarily limited to the specific features or methods described. Rather, the specific features and methods are disclosed as examples of implementations for facilitating an interactive engagement for the user.

We claim:

1. A computer implemented method for facilitating an interactive engagement of a user with an online application, wherein the online application comprises a plurality of questions, the method comprising:

presenting one or more first questions of the plurality of questions, to the user;

receiving a first response, from the user, corresponding to the one or more first questions, wherein the first response indicates behavioural characteristics of the user;

assigning a first engagement metric, of the user, based on the first response;

calculating an abandonment metric for one or more second questions to determine incentives to the user such that the one or more second questions are positioned in an order based on a predetermined risk of abandonment of a question;

presenting the one or more second questions, to the user, wherein the one or more second questions are dynamically restructured based on the first engagement metric and on the abandonment metric;

receiving a second response, from the user, corresponding to the one or more second questions;

modifying the first engagement metric into a second engagement metric based on the second response, wherein the second engagement is determined by calculating weighted average for each of the second response, and wherein based on the second engagement matric and rate of the second response received, the abandonment metric is dynamically generated for each of the second questions;

calculating a score based on the second engagement metric; and presenting the score to the user, on a user interface, such that the interactive engagement of the user is enhanced during the interaction with the online application, wherein subsequent questions to the one or more second questions in the online application are dynamically restructured.

2. The method of claim 1, further comprising presenting at least one of incentives and disincentives to the user based on the first engagement metric.

3. The method of claim 2, wherein the score is further calculated based on the second engagement metric and at least one of the incentives and the disincentives.

4. The method of claim 1, further comprising comparing the score with a peer score, wherein the peer score indicates a score corresponding to another user.

5. The method of claim 4, further comprising displaying the score and the peer score on the user interface in an ascending order or in a descending order.

6. The method of claim 5, wherein the score and the peer score is compared based on at least of: demography/location of the user, the first response, and the second response.

7. The method of claim 1, wherein the first response and the second response are further received from another user via a social network.

8. The method of claim 1, wherein the presentation further comprises displaying a status of the score on the user interface, to the user, in real-time, wherein the status indicate completeness of the online application.

9. The method of claim 1, wherein the behavioural characteristics comprises at least one of: a level of personal details disclosure, participation of the user in a crowd source, use of a social network by the user for responding to the first question, an attention/confusion level of the user, navigation habits of the user on a user/client device.

10. The method of claim 1, wherein the abandonment metric is calculated using at least one of: a machine learning technique and a data mining technique.

11. A system for facilitating an interactive engagement of a user with an online application, wherein the online application comprises a plurality of questions, the system comprising:
    a processor; and
    a memory coupled to the processor, wherein the processor executes a plurality of modules stored in the memory, and wherein the plurality of modules comprising:
        a first presenting module to present one or more first questions of the plurality of questions, to the user, associated with the online application;
        a first reception module to receive a first response, from the user, corresponding to the one or more first questions, wherein the first response indicates behavioural characteristics of the user;
        an assigning module to assign a first engagement metric, of the user, based on the first response;
        a second presenting module to
            calculate an abandonment metric for one or more second questions to determine incentives to the user such that the one or more second questions are positioned in an order based on a predetermined risk of abandonment of a question;
            present the one or more second questions, to the user, associated with the online application, wherein the one or more second questions are dynamically restructured based on the first response and on the abandonment metric; and
        a second reception module to receive a second response, from the user, corresponding to the one or more second questions; and
        an analysing module to:
            modify the first engagement metric into a second engagement metric based on the second response, wherein the second engagement is determined by calculating weighted average for each of the second response, and wherein based on the second engagement matric and rate of the second response received, the abandonment metric is dynamically generated for each of the second questions;
            calculate a score based on the second engagement metric; and
            present the score to the user, on a user interface, such that the interactive engagement of the user is enhanced during the interaction with the online application, wherein subsequent questions to the one or more second questions in the online application are dynamically restructured.

12. The system of claim 11, wherein the second presenting module further presents at least one of incentives and disincentives to the user based on the first engagement metric.

13. The system of claim 12, wherein the score is further calculated based on the second engagement metric and at least one of the incentives and the disincentives.

14. The system of claim 11, wherein the analysing module further compares the score with a peer score, wherein the peer score indicates a score corresponding to another user.

15. The system of claim 14, wherein the analysing module further displays the score and the peer score on the user interface in an ascending order or in a descending order.

16. The system of claim 11, wherein the first response and the second response are further received from another user via a social network.

17. The system of claim 11, wherein the analysing module further displays a status of the score on the user interface, to the user, in real-time, wherein the status indicate completeness of the online application.

18. The system of claim 11, wherein the behavioural characteristics comprises at least one of: a level of personal details disclosure, participation of the user in a crowd source, use of a social network by the user for responding to the first question, an attention/confusion level of the user, navigation habits of the user on a user/client device.

19. The system of claim 11, wherein the abandonment metric is calculated using at least one of: a machine learning technique and a data mining technique.

20. A non-transitory computer readable medium embodying a program executable in a computing device for facilitating an interactive engagement of a user with an online application, wherein the online application comprises a plurality of questions, the program comprising:
    a program code for presenting one or more first questions of the plurality of questions, to the user, associated with the online application;
    a program code for receiving a first response, from the user, corresponding to the one or more first questions, wherein the first response indicates behavioural characteristics of the user;
    a program code for assigning a first engagement metric, of the user, based on the first response;
    a program code for calculating an abandonment metric for one or more second questions to determine incentives to the user such that one or more second questions are positioned in an order based on a predetermined risk of abandonment of a question;
    a program code for presenting the one or more second questions, to the user, associated with the online application, wherein the one or more second questions are dynamically restructured based on the first engagement metric and on the abandonment metric;
    a program code for receiving a second response, from the user, corresponding to the one or more second questions;
    a program code for modifying the first engagement metric into a second engagement metric based on the second response, wherein the second engagement is determined by calculating weighted average for each of the second response, and wherein based on the second engagement matric and rate of the second response received, the abandonment metric is dynamically generated for each of the second questions;
    a program code for calculating a score based on the second engagement metric; and
    a program code for presenting the score to the user, on a user interface, such that the interactive engagement of the user is enhanced during the interaction with the online application, wherein subsequent questions to the one or more second questions in the online application are dynamically restructured.

* * * * *